United States Patent [19]
Boling

[11] Patent Number: 6,145,249
[45] Date of Patent: Nov. 14, 2000

[54] PLANT DRAINAGE/FEEDER SYSTEM

[76] Inventor: John C. Boling, 231 Waller St., San Francisco, Calif. 94102

[21] Appl. No.: 09/096,268

[22] Filed: Jun. 11, 1998

Related U.S. Application Data

[63] Continuation-in-part of application No. 08/683,734, Jul. 18, 1996.

[51] Int. Cl.⁷ .................................................. A01G 27/00
[52] U.S. Cl. ................................................................ 47/79
[58] Field of Search .................. 47/66.1, 79, 80, 47/81, 48.5

[56]         References Cited

U.S. PATENT DOCUMENTS

| | | | |
|---|---|---|---|
| 4,232,482 | 11/1980 | Watt | 47/71 |
| 4,276,720 | 7/1981 | Lyon | 47/39 |
| 4,287,682 | 9/1981 | Browne | 47/81 |
| 4,603,506 | 8/1986 | Powell | 47/62 |
| 4,986,699 | 1/1991 | Bohnhoff | 405/50 |
| 5,190,404 | 3/1993 | Kiyokawa | 405/45 |
| 5,644,868 | 7/1997 | Lui | 47/81 |

FOREIGN PATENT DOCUMENTS

| | | | |
|---|---|---|---|
| 815709 | 7/1937 | France . | |
| 2384445 | 11/1978 | France . | |
| 2 701 808 | 2/1994 | France | 47/81 |
| 1003488 | 2/1957 | Germany . | |
| 9-205893 | 12/1997 | Japan . | |
| 17945 | of 1910 | United Kingdom . | |
| 22647 | of 1912 | United Kingdom | 47/80 |
| 403460 | 12/1933 | United Kingdom | 47/79 |

*Primary Examiner*—Charles T. Jordan
*Assistant Examiner*—Jeffrey L. Gellner

[57]         ABSTRACT

Drainage/feeder apparatus allows a vessel such as a pot to be advantageously drained of and supplied with fluids. The inventive drainage apparatus includes a drainage/feeder member including a base member, a drainage channel member and a feeder channel member. The base member is affixed to a portal of the vessel so as to allow drainage and feeding of fluids when the vessel is filled with soil. Water gravitationally drains out of the portal and into the drainage channel member, so as to dispose of the water at a selected distance away from the portal. The waste water can be further channeled away from the pot by engaging a hose member to the channel member in order to channel the liquid farther away. Likewise, water, fertilizer or the like is introduced into the interior of the pot via the portal and the drainage channel member. The drainage/feeder member can be affixed to the pot by a laminated adhesive layer or alternatively by caulking. In alternative embodiments, the apparatus may be affixed to the pot with a mechanically-biased toggle scheme. Also a sole feeder channel member may be provided without the drainage channel member.

13 Claims, 7 Drawing Sheets

PLANT DRAINAGE/FEEDER SYSTEM

This is a Continuation-in-Part of U.S. patent application Ser. No. 08/683,734, filed Jul. 18, 1996 and entitled "Plant Drainage System," which is incorporated by reference herein.

BACKGROUND OF THE INVENTION

1. Field of the Invention

This invention relates to a plant drainage/feeder system, especially the drainage and feeding of fluid through a portal of a plant-containing vessel. More particularly it is concerned with apparatus mounted on a pot so as to provide advantageous drainage of waste water away from the floor or deck where the pot is standing, and the feeding of new water into the interior of the pot.

2. Description of the Prior Art

Plant pots come in a variety of sizes and shapes but typically have a hole or drainage portal in the bottom to allow for gravitational drainage of water, which may include used plant food or the like. While the drainage hole is designed to allow the fluid to escape the pot, such a passive system creates several problems. Often the pot is standing on a saucer-like plate having an upstanding rim to catch and contain the water. The problem is that the drainage water stands in the plate until it evaporates, is manually removed or recycled into the topsoil of the plant.

Manual removal of the water sometimes does not occur as often as desirable for any number of reasons, e.g. the plant owner may be absent for an extended period, may simply forget or the pot may be heavy or difficult to lift. The drainage water may therefore be left standing for a long period of time, which is hygienically and esthetically undesirable.

Manual removal itself creates problems, since spillage sometimes occurs. Also the standing water can also overflow the saucer if not removed for an extended period. Further, it is evident that a system which eliminates the necessity for manual removal of water would be inherently desirable by reducing plant maintenance.

In addition to the drainage function, most plants require watering, feeding and fertilizing. Fertilizer solutions often take care of both the need for water and fertilizer. To the present time no system has effectively dealt with both drainage and feeding in one apparatus (for purposes of this document "feeding" shall be understood to include application of fertilizer, water and other beneficial substances). Therefore consumers must provide two systems: one for drainage, one for feeding. This lack of "one-stop-shopping" obviously increases cost and effort for the consumer. In addition, many feeder systems are awkward in that they feed from the top and thus are mechanically unstable, as well as aesthetically undesirable.

What is needed is a system that provides for both feeding and drainage in one system, in an aesthetically pleasing and mechanically stable fashion.

SUMMARY OF THE INVENTION

The problems outlined above are solved by the module and system provided in accordance with the present invention. That is to say, the drainage/feeder module hereof serves to channel fluid out (drainage) and in (feeding) a vessel via one apparatus rather than two, and further provides mechanical stability and ease of installation.

The apparatus in accordance with the invention broadly includes a drainage/feeder module having a base member, a drainage channel member, a feeder channel member and an adhesive layer. The base member has a first side and a second side, including portions defining a drainage hole and a feeder hole, both disposed between the first and second sides. The drainage channel member is sealingly affixed to the base member, and has a first open end and a second open end and disposed to define a drainage channel, such that the first open end of the drainage channel member is in spatial communication with the drainage hole of the base member. Likewise, the feeder channel member is sealingly affixed to the base member, and has a first open end and a second open end and disposed to define a feeder channel, such that the first open end of the feeder channel member is in spatial communication with the feeder hole of the base member. The adhesive layer is disposed adjacent the first side of the base member, and is suitable for adhesion to the wall of the pot. The adhesive layer may be a laminar tape or any other adhesive substance such as a glue or caulk.

When the holes of the base member are aligned with the portal of the vessel member and the adhesive layer is attached to the wall of the vessel, the drainage/feeder module serves to provide directed fluid communication respectively between the interior of the vessel and one end of the drainage channel member and one end of the feeder channel member, so that fluid is directed into and out of the interior of the vessel.

In preferred embodiments, the drainage/feeder module is a drainage/feeder assembly including drainage and feeder hoses for further channeling fluid into and out of the interior of the pot. The feeder/drainage assembly can be mounted exteriorly of the pot, or on the interior.

In alternative embodiments, the module may be affixed to the pot with a mechanically-biased toggle scheme. Also a sole feeder channel member may be provided without the drainage channel member or vice versa.

DESCRIPTION OF THE PREFERRED EMBODIMENT

Figure 1A:
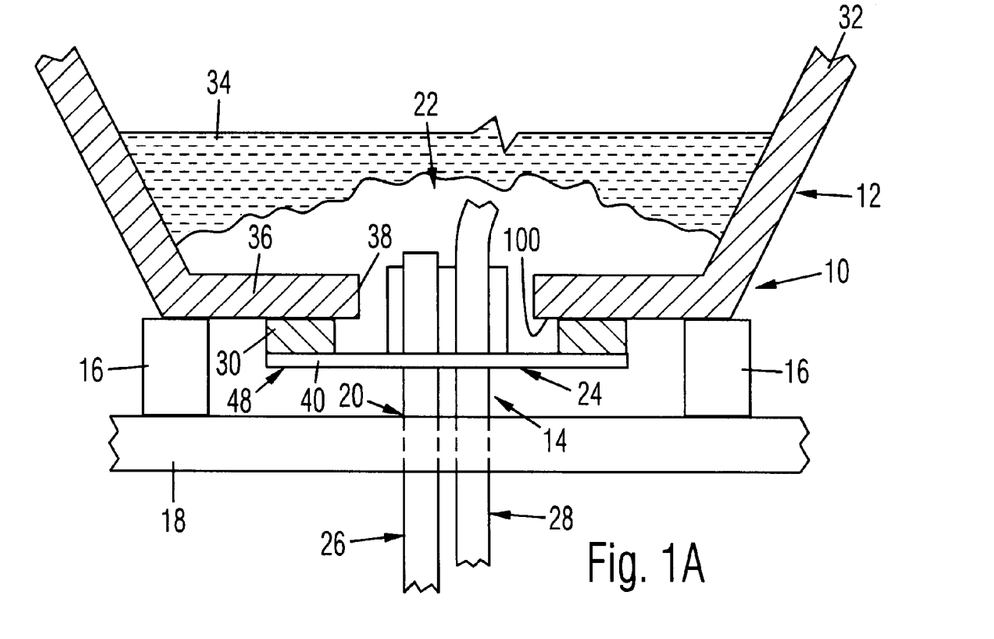
FIG. 1A is a partially sectional, side elevational view of a drainage/feeder system mounted on blocks in accordance with the present invention.

Referring now to the drawings in general and FIG. 1A in particular, a drainage/feeder system 10 broadly includes a vessel or pot 12 and drainage/feeder assembly 14, system 10 being elevated by blocks 16 above a floor 18, which could also be a deck or other suitable surface. Drainage assembly 14 in accordance with the invention advantageously channels drainage fluid such as water (not shown) away from an area 20 where standing fluid would be undesirable.

Drainage/feeder assembly 14 also advantageously channels fertilizer, fresh water or the like into pot 12 in a feeding area such as indicated by reference numeral 22. FIG. 1A is a partial depiction for ease of illustration.

Drainage/feeder assembly 14 includes drainage/feeder member or module 24, drainage hose member 26 and feeder hose member 28. Drainage/feeder module 24 optionally includes an adhesive laminar tape or layer 30 (see FIGS. 2A and 2B for exploded views). Drainage assembly 14 is mounted on pot 22 as discussed below. Drainage/feeder member 24 is suitable for draining fluid from pot 12, especially from area 20. Drainage/feeder member 24 is also suitable for introducing feeding fluids into pot 12, such as at area 22. Pot 12 has a wall 32 which defines an interior 34 of vessel 12. Wall 32 also has a base 36 which includes portions defining a portal 38 through wall 32, through which fluid can pass.

Figure 2A:
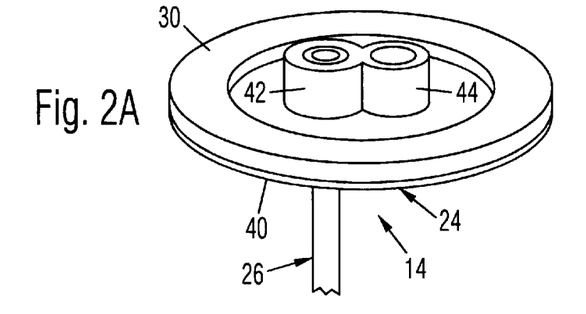
FIG. 2A is an exploded, partial, perspective view of a drainage/feeder assembly.

Referring to FIG. 2A, drainage/feeder assembly 14 is shown without feeder hose member 28 for ease of illustration. Drainage/feeder member 24 has a base member 40, a drainage channel member 42 and a feeder channel member 44, as well as the previously mentioned adhesive layer 30.

Figure 2B:
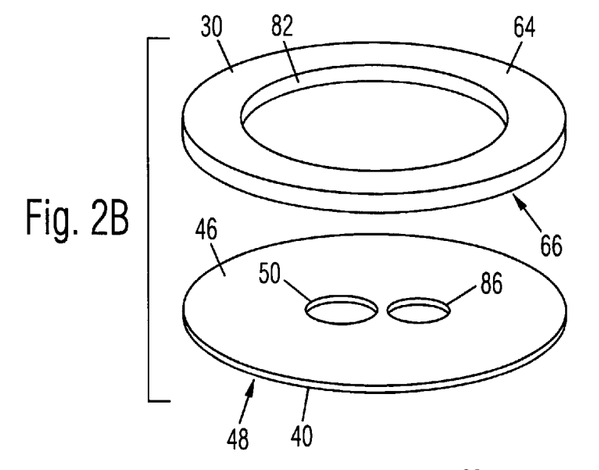
FIG. 2B is an exploded, perspective view of a laminar tape and base member.

Referring to FIG. 2B, base member 40 has a first side 46, a second opposite side 48 (see also FIG. 1A for second side 48 of base member 40) and portions of base member 40 defining a hole 50.

Figure 2C:
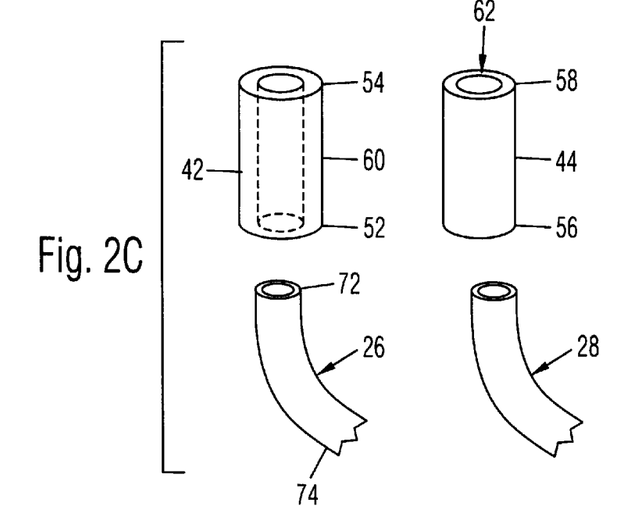
FIG. 2C is an exploded, partial, perspective view of two channel members and hose members.

Referring to FIG. 2C, drainage channel member 42 and feeder channel 44 are shown in exploded view with drainage hose member 26 and feeder hose member 28. Drainage channel member 42 and feeder channel member 44 are sealingly affixed to base member 40 (although shown in isolation in FIG. 2C for clarity). Drainage channel member 42 includes a first open end 52 and a second open end 54. Feeder channel member 44 includes a first open end 56 and a second open end 58. Drainage channel member 42 is disposed to define a drainage channel 60, shown in dotted line detail for clarity. Channel 60 places first open end 52 in spatial communication with second open end 54. Likewise feeder channel member 44 is disposed to define a feeder channel 62 which places first open end 56 in spatial communication with second open end 58.

Referring again to FIG. 2B, adhesive member 30 is adhesive on a first side 64 and a second opposite side 66 thereof Second side 66 of tape 30 adheres to first side 46 of base member 40.

Drainage/feeder module 24 is preferably made of an synthetic resin material by injection molding, as is well known in the art. In particular, moderately flexible vinyl (about 105 shore) is injection molded, to integrally form base member 40, drainage channel member 42 and feeder channel member 44, in the preferred method of manufacture.

Figure 4A:
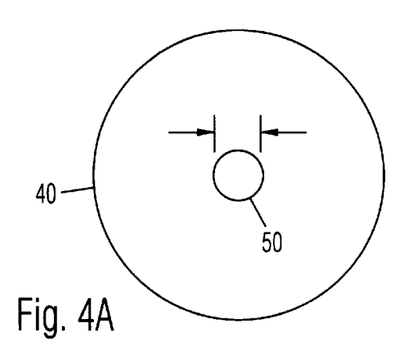
FIG. 4A is a plan view of a base member.
Figure 4B:
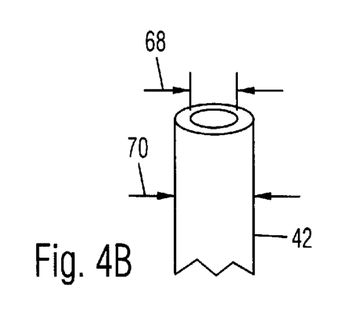
FIG. 4B is a partial, side perspective view of a channel member.

Referring again to FIG. 2C, second open end 54 of drainage channel member 42 presents an inner diameter 68 and an outer diameter 70 (as indicated in FIG. 4B). Feeder channel member 44 likewise has an analogous inner diameter and outer diameter (not shown). Drainage hose member 26 includes a first open end 72. Drainage hose member 26 also has a second open end 74. In the preferred embodiment, drainage hose member 26 is removably engaged with second open end 54 of drainage channel member 42.

Drainage channel 60 is ⅜" in length (see FIG. 2C). Inner diameter 68 is 5/16", outer diameter 70 is 9/16", with a ⅛ inch wall (see FIG. 4B). Drainage hose member 26 is made of moderately flexible extruded vinyl (about 90 durometers). Drainage hose member 26 is 18 inches long and ¼" internal dimension with a 1/32" wall. Feeder channel 62 is the same length as drainage channel 60, but the dimensions of the inner and outer diameter of feeder channel member 44 are less than those of inner diameter 68 and outer diameter 70 because a narrower channel is desirable for feeding than drainage, as will readily be appreciated.

Figure 2D:
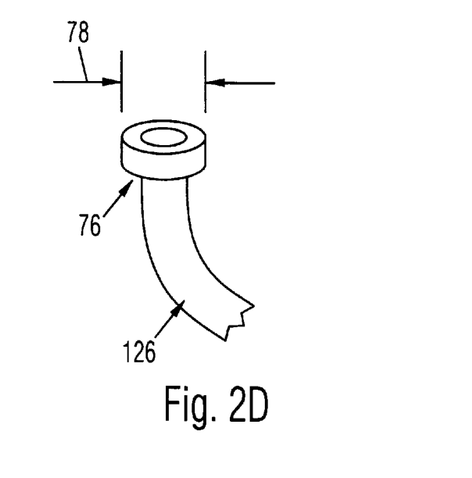
FIG. 2D is an exploded, partial, perspective view of an alternative hose member.
Figure 7:
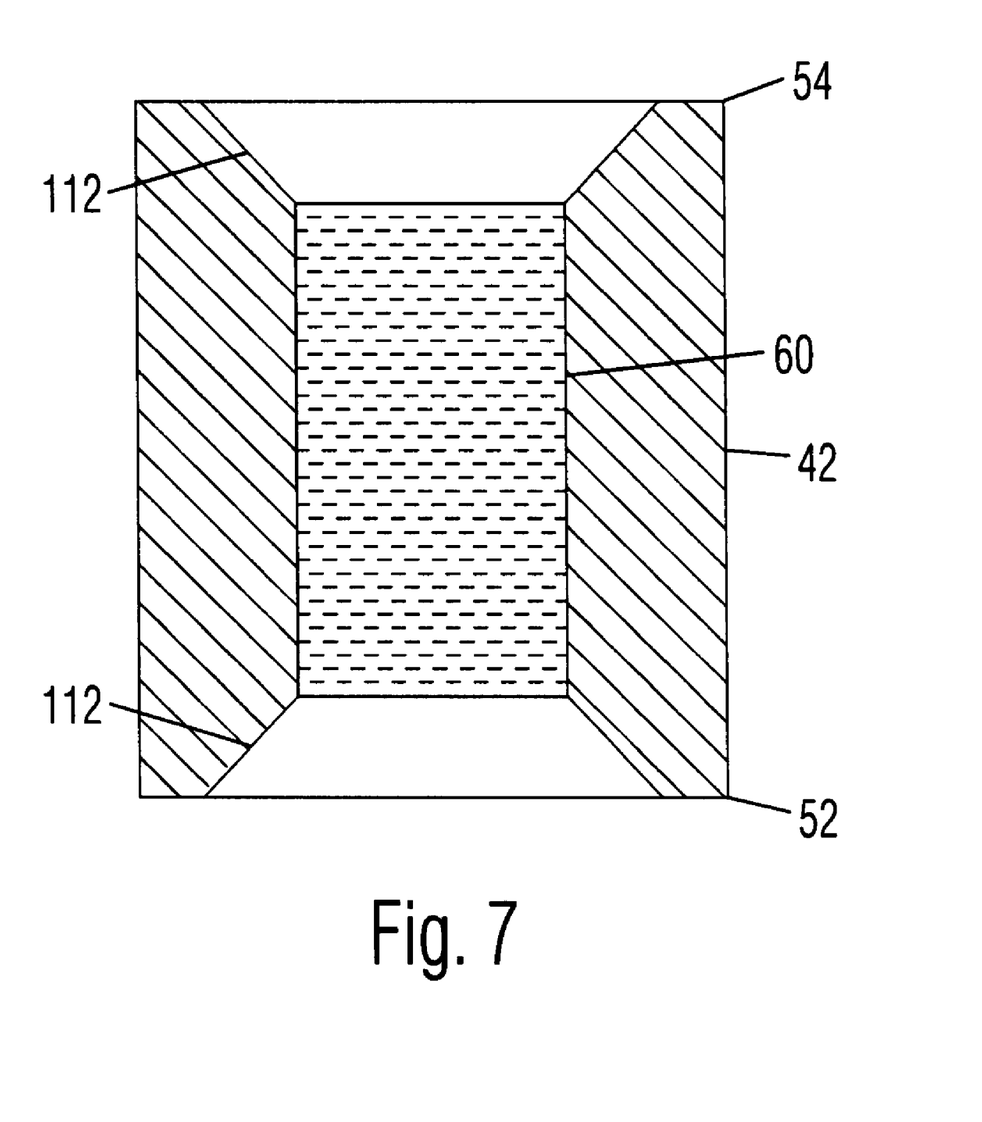
FIG. 7 is a sectional view of a drainage channel member in accordance with the present invention.

Referring to FIG. 2D, an alternative drainage hose member 126 includes a hose adapter 76 which presents an outer diameter 78. Drainage hose member 26 includes a hose adapter 76 which is fitted to a first open end 72 of drainage hose member 26. Drainage hose member 26 also has a second open end 74. The inner diameter 68 of drainage channel member 42 and the outer diameter 78 of hose adapter 76 are substantially similar so that drainage hose member 26 is sealingly engaged with drainage channel member 42 by virtue of the snug fitting of hose adapter 76 in second open end 54 of drainage channel member 42. For purposes of receiving drainage hose member 26 or 126, drainage channel member 42 has beveled areas 80, 82, respectively at first open end 52 and second open end 54 (see FIG. 7).

Referring again to FIG. 2B, laminated tape member 30 includes a hole 82 aligned with drainage hole 50 and feeder hole 86 of base member 40 so that fluid can pass through hole 82, drainage hole 50 and feeder hole 86.

Figure 1B:
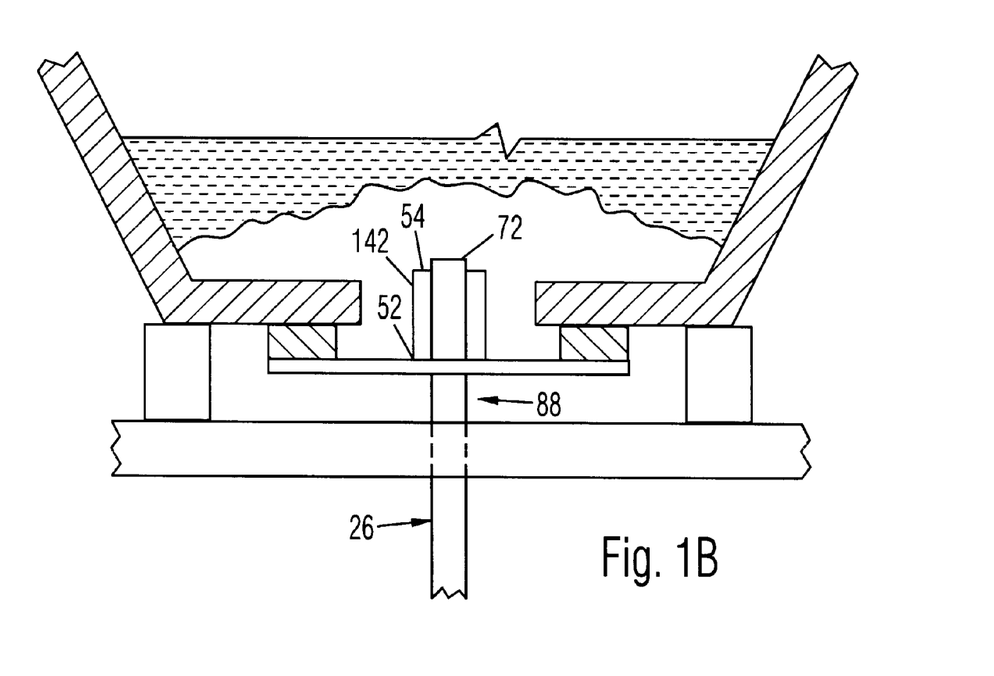
FIG. 1B is a partially sectional, side elevational view of a drainage system mounted on blocks in accordance with the present invention.

Referring to FIG. 1B, a modified drainage assembly 88 has only a modified drainage channel member 142 (no feeder channel member). Modified drainage member 142 has a first open end 52 and a second open end 54. Drainage hose member 56 is positioned in drainage 142 so that first open end 72 is essentially flush with first open end 54. Drainage hose member 26 is actually illustrated in FIG. 1C as being slightly higher than drainage channel member 142 for ease of depiction.

Figure 1C:
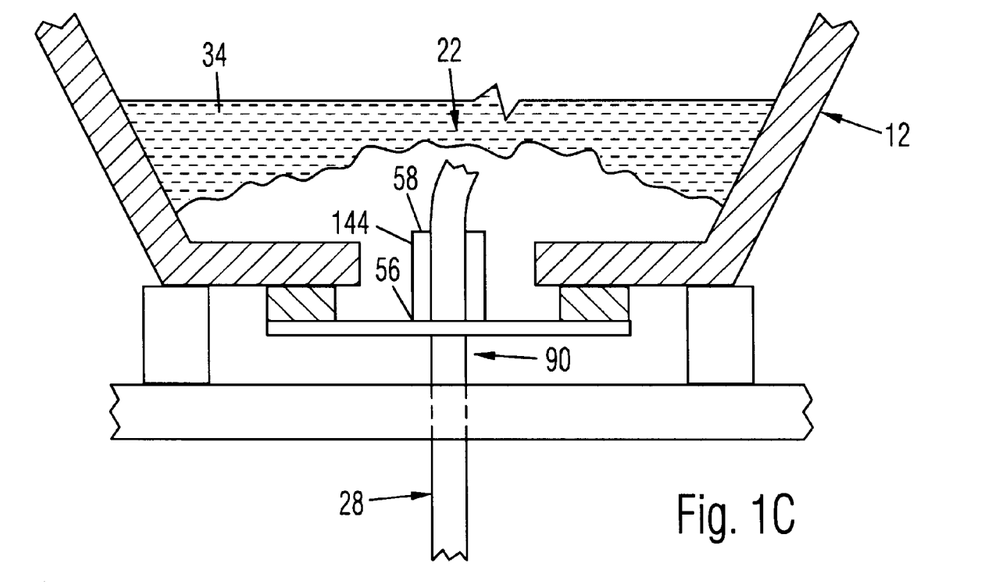
FIG. 1C is a partially sectional, side elevational view of a feeder system mounted on blocks in accordance with the present invention.

Referring to FIG. 1C, a modified drainage assembly 90 has only a modified feeder channel member 144 (no drainage channel member). Modified feeder member 144 has a first open end 56 and a second open end 58. Feeder hose member 28 is positioned in feeder channel member 144 so that the first open end (not shown) protrudes into interior 34 of pot 12 to a desired area such as 22 for optimal feeding of the soil or plant. As will be readily appreciated by those skilled in the art, area 22 will be located near of the center of pot 12 or can be re-positioned as circumstances dictate.

Figure 3A:
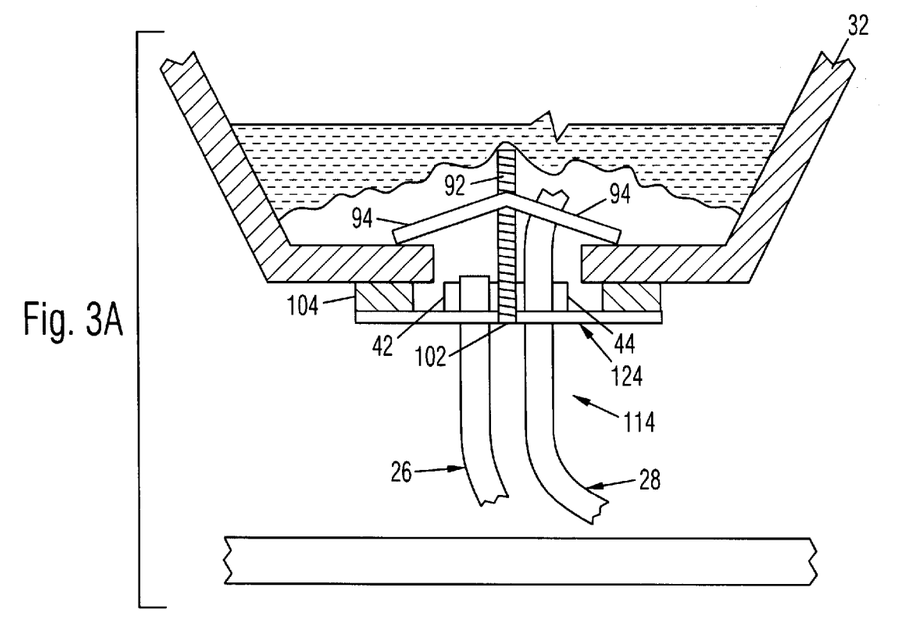
FIG. 3A is a partially sectional, side elevational view of an alternative drainage/feeder system featuring a threaded bolt and toggle members.

Referring to FIG. 3A, a modified drainage/feeder assembly 114 is shown. Blocks are not shown for ease of illustration. Drainage/feeder assembly 114 includes modified drainage/feeder member 124, drainage hose member 26 and feeder hose member 28. Modified drainage/feeder member 124 includes drainage channel member 42 and feeder channel member 44, as well as bolt member 92 and a pair of spring biased, relatively rigid toggle members 94.

Figure 3B:
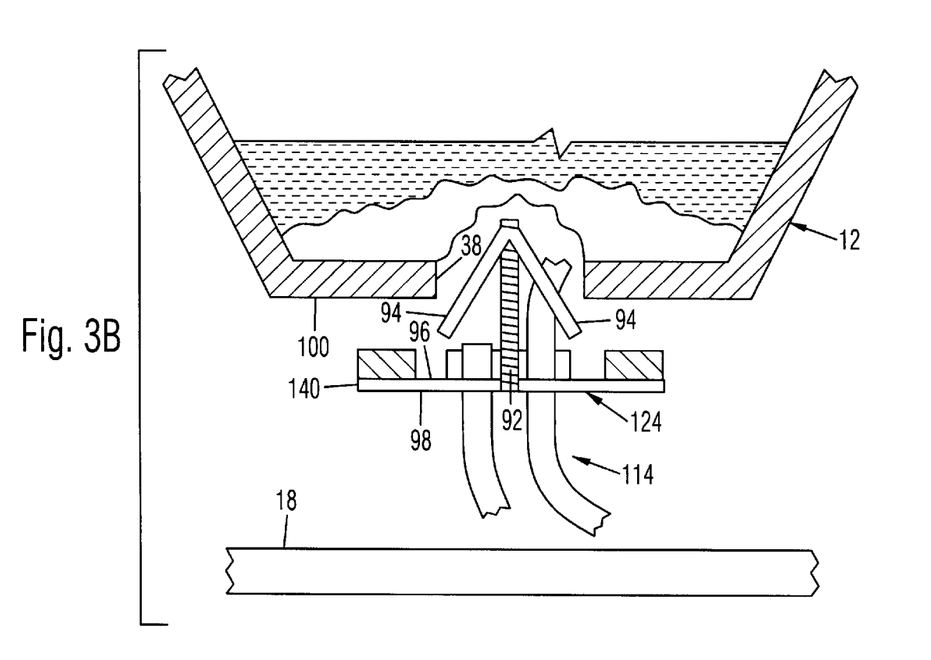
FIG. 3B is a partially sectional, side elevational view illustrating the installation of the alternative assembly of FIG. 3A.

Referring to FIG. 3B, modified drainage/feeder assembly 114 is show in installation. As will be appreciated from the illustration, toggle or wing members 94 (which are mounted on bolt member 92) are retracted by being pushed through portal 38. When toggle members 94 clear portal 38 they snap back into a substantially cantilevered position, substantially orthogonal to the longitudial axis of bolt 92 (as shown in FIG. 3A). FIG. 3B also illustrates a modified base member 140 of drainage/feeder module 124, base member 140 having a first side 96 and a second side 98. Pot 12 also includes a bottom exterior 100.

Figure 3C:
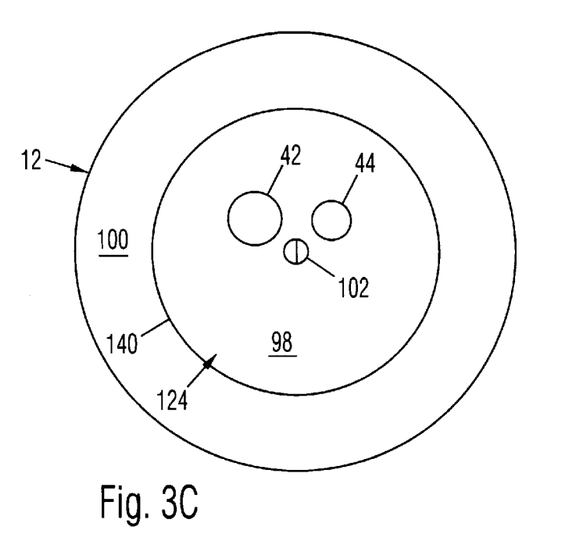
FIG. 3C is a bottom view of the drainage/feeder module of FIG. 3A.

Referring to FIG. 3C, a bottom view of drainage/feeder member 124 is seen when mounted to pot 12. A substantially sealed mounting, as shown in FIG. 3A is achieved by first inserting drainage/feeder member 24 until toggle members 94 are returned to their fully biased position and then a bolt head 102 of bolt member 92 is adjusted to tighten toggle members 94 and a washer 104 (see FIG. 3A) against wall 32.

Figure 5:
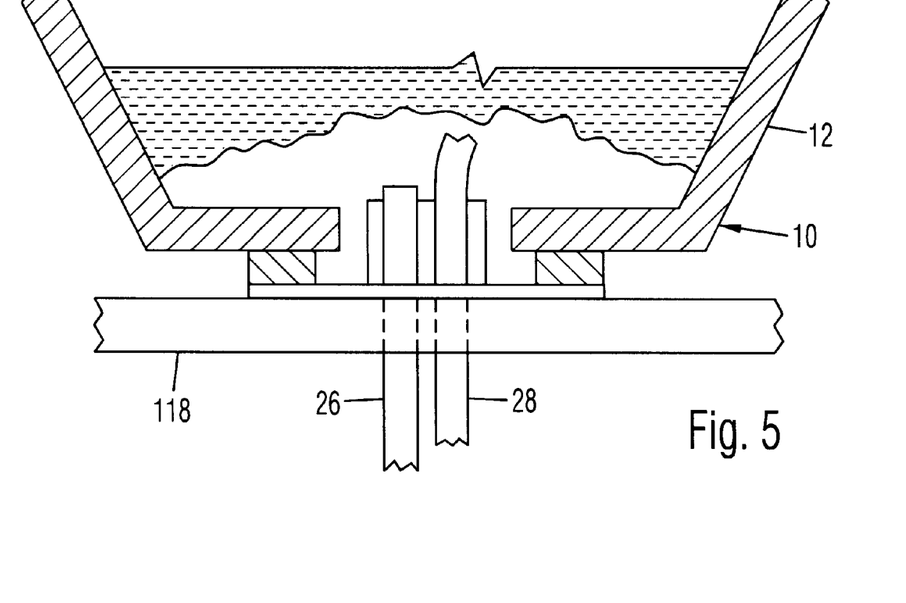
FIG. 5 is a partially sectional, side elevational view of a drainage/feeder system in accordance with the present invention.

Referring to FIG. 5, drainage/feeder system 10 is illustrated in a slightly different configuration, wherein blocks 16 are not used so that pot 12 rests directly on floor 118. (It will be noted that pot 12 is not graphically shown to rest on floor 118 but it is readily understood that in fact pot 12 does rest on floor 118 and FIG. 5 is depicted in this fashion only for more detail with respect to drainage/feeder assembly 14. Hose members 26 and 28 protrude through a slat (not shown) in floor 118.

Figure 6:
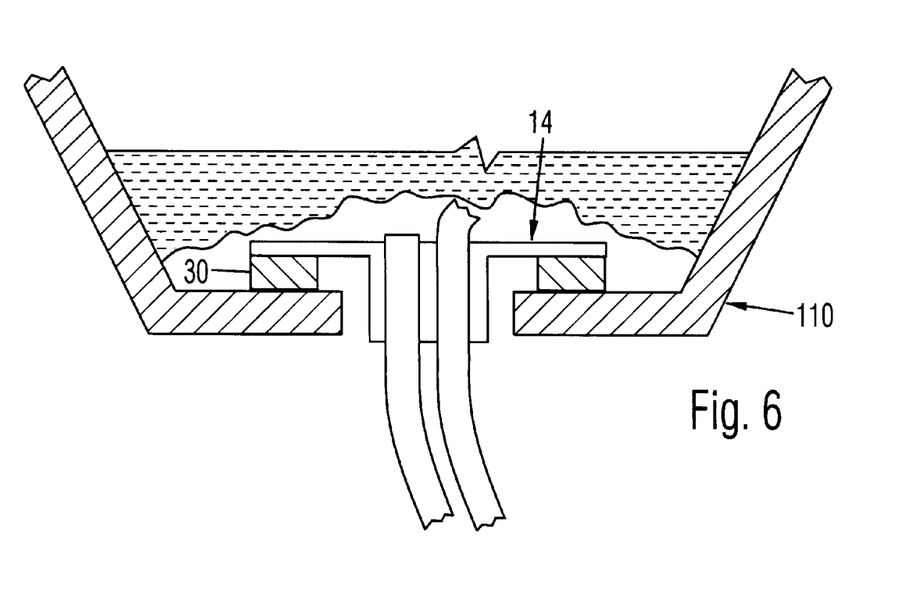
FIG. 6 is a partially sectional, side elevational view of a drainage/feeder system wherein the drainage/feeder assembly is mounted on the interior of the pot.

Referring to FIG. 6, yet another embodiment of the invention is shown. A system 110 is shown similar to that of system 10 in FIGS. 1 and 5 except drainage/feeder assembly 14 is contacted to the interior bottom 108 of pot 12. Those skilled in the art will readily appreciate that drainage/feeder assembly 14 could also be attached without benefit of tape 30, but rather by another adhesive layer such as glue, caulk or the like.

Referring briefly now to the method of manufacture, all drainage/feeder members are preferably injection-molded and both ends of channel members are preferably beveled at 45 degrees. For example at FIG. 7, drainage channel 42 presents beveled portions 112 at open ends 52, 54. The installation of the drainage/feeder assembly 14 to pot 12 will now be discussed. An adhesive layer such as laminar tape 30 is disposed adjacent first side 46 of base member 40, adhesive layer 30 being suitable to affix to wall 38 of pot 12. It will be readily understood that in place of laminar tape 30 a glue or other adhesive could be applied directly to pot 12. Holes 50, 86 of base member 46 are aligned with portal 38 and adhesive layer 30 is attached to wall 38 of pot 12 (if not done previously), so that drainage/feeder module 24 serves to provide direct fluid communication between interior 34 of pot 12 and second open end 54 of drainage channel member, as well as second open end 58 of feeder channel member 44. It will readily be appreciated that drainage/feeder member 24 can be used in conjunction with hose members 26, 28 (i.e., so as to construct drainage/feeder assembly 14 to provide further channeling for drainage and feeding).

The installation for the embodiment of FIG. 1A will now be described in particular. In addition to applying laminar tape 30 to bottom exterior 100 of wall 32 as described above, a primer may be applied to bottom exterior 100 proximately to portal 38 prior to application of laminar tape 30. When adhesive tape 30 is applied, portal 38 is indexed with holes 50 and 86 (see FIG. 2B) of base member 40. Before application of adhesive tape 30, bottom exterior 100 of pot 12 is cleaned with a rag. Also, sandpaper can be used to remove mineral build-up, etc. Preferred is 3M 94 primer (commercially available from the 3M company) which is applied to thinly cover the area where adhesive tape 30 will be applied. The primer must dry before application of adhesive tape 30. Channel members 42, 44 are inserted into portal 38 and base member 40 is firmly pressed to bottom exterior 100 so as to gain adhesion between tape 30 and pot 12. The preferred laminar tape is a double-sided, acrylic foam, available from the 3M Company as product number 4496.

As alternative to using adhesive tape 30, a caulk such as a polyurethane Sikaflex 221 (available from Sika Corporation of Southfield, Mich.) may be used to directly mount base member 40 to pot 12. The caulk is spread ¾ of an inch wide around portal 38 and about ⅛" in thickness. This is an alternative method to achieve a water-tight seal.

In operation, and referring once again to FIG. 1A, drainage/feeder member 24 transfers waste fluid from interior 34 of pot 12 via channel 60 of drainage channel member 42 to drainage hose member 26 so that it can be diverted away from area 20. Waste water drips out gravitationally. In this fashion the fluid which gravitationally exits portal 38 is taken to an area more desirable than area 20. In substitution for hose 26 it is readily appreciated that a garden hose or a metal conduit or the like could be used, or any other external apparatus so as to channel water away.

Referring to FIG. 2C, it should be noted that the preferred relationship of drainage member 42 and drainage channel member 26 is to achieve a re-attachable, sealing, snug fit there between, by virtue of the outer diameter of drainage channel member 26 relative to inner diameter 68 of drainage member 42 (see also FIG. 4B). Beveled areas 112 serve to facilitate easy insertion of hose members into channel members.

Feeder hose member 28 is connected to a water source (not shown), such as a public utility water line. Preferably, the water source reasonably pressurizes feeder hose member 28, since the fluid route into pot 12 will normally be at least partially uphill. An automatic timer (not shown) may be interfaced between feeder hose member 28 and the water source. As will be readily appreciated by those skilled in the art, the portion of feeder hose member 28 extending into interior 34 of pot 12 may be coupled to an emitter (not shown) for optimal feeding diffusion.

It will be noted that drainage and feeding are done in a mechanically secured fashion by virtue of channel members 42 and 44 respectively. This is in contrast to systems where, for example, a feeder hose is loosely hung over the rim of a pot.

It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A drainage/feeder module suitable for respectively, fluid drainage and feeding from and to a vessel, the vessel having a wall defining an interior of the vessel, portions of the wall further defining a portal through the wall, the module comprising:

(a) a base member having a first side and a second side, including portions defining a drainage hole and a feeder hole disposed between the first and second sides, wherein the drainage hole and feeder hole of the base member are adapted to be aligned with the portal of the vessel and the first side of the base member is adapted to be adhesively attached to the wall of the vessel;

(b) a drainage channel member sealingly affixed to the base member, the drainage channel member having a first open end and a second open end wherein the second open end is a bottom end, and disposed to define a drainage channel, such that the first open end of the drainage channel member is in spatial communication with the drainage hole of the base member;

(c) a feeder channel member sealingly affixed to the base member, the feeder channel member having a first open end and a second open end wherein the second open end is a bottom end, and disposed to define a feeder channel member, such that the first open end of the feeder channel member is in spatial communication with the feeder hole of the base member, (d) a drainage hose member connected to the second open end of the drainage channel member, wherein the drainage hose member is flexible enough for bending under the vessel, and is long enough for extending outside the vessel for draining excess fluid at a selected distance away from a bottom of the vessel and thus avoiding standing fluid under the vessel, and (e) a feeder hose member connected to the second open end of the feeder channel, wherein the feeder hose member is flexible enough for bending under the vessel, and is long enough for extending outside the vessel for receiving a feeding fluid from outside the vessel and directing the feeding fluid into the vessel.

2. The drainage/feeder module of claim 1, further including a laminated tape member with one side adhesively attached to said base member, and another side for adhesively attaching to the wall of the vessel.

3. The drainage/feeder module of claim 1, wherein both the drainage channel member and feeder channel member are constructed of a sufficiently flexible material to resiliently deform when disposed so as to be below the vessel and between the vessel and a hard surface.

4. The drainage/feeder module of claim 1, wherein the second open end of the drainage channel member is inwardly beveled so as to be adapted for easy insertion of a drainage hose member.

5. The drainage/feeder module of claim 1, wherein the second open end of the feeder channel member is inwardly beveled so as to be adapted for easy insertion of a feeder hose member.

6. The drainage/feeder module of claim 1, wherein the first and second open ends of both the drainage channel member and the feeder channel member are inwardly beveled so as to be adapted for easy insertion of respective hose members.

7. A feeder member suitable for feeding fluid into a vessel having a wall defining an interior of the vessel, portions of the wall further defining a portal through the wall, the feeder member comprising:

(a) a base member having a first side and a second side, including portions defining a hole disposed between the first and second sides for aligning with the portal of the vessel;

(b) a channel member sealingly affixed to the base member, the channel member having a first open end and a second open end wherein the second open end is a bottom end, and disposed to define a channel, such that the first open end is in spatial communication with the hole of the base member;

(c) an adhesive layer disposed adjacent the first side of said base member, the adhesive layer suitable for adhesion to the wall of the vessel, and (d) a hose member connected to the second open end of the channel member, wherein the hose member is flexible enough for bending under the vessel, and is long enough for extending outside the portal of the vessel and conducting a fluid between the vessel and a distant location outside the vessel.

8. The drainage/feeder module of claim 7, wherein the second open end of the channel member is inwardly beveled to enable the hose member to be easily inserted.

9. A feeder member suitable for feeding fluid into a vessel, the vessel having a wall defining an interior of the vessel, portions of the wall further defining a portal through the wall, the feeder member comprising:

(a) a base member having a first side and a second side, including portions defining a feeder hole disposed between the first and second sides;

(b) a feeder channel member sealingly affixed to the base member, the feeder channel member having a first open end and a second open end wherein the second open end is a bottom end, disposed to define a feeder channel, such that the first open end of the feeder channel member is in spatial communication with the feeder hole of the base member, and (c) a feeder hose member connected to the second open end of the feeder channel member, wherein the feeder hose member is flexible enough for bending under the vessel, and is long enough for extending outside the vessel and receiving a feeding fluid from outside the vessel and directing the feeding fluid into the vessel.

10. The drainage/feeder module of claim 9, wherein the second open end of the feeder channel member is inwardly beveled to enable the feeder hose member to be easily inserted.

11. In combination, a drainage/feeder system comprising:

(a) a vessel having a wall presenting an interior surface and an exterior surface, the interior surface defining an interior of the vessel, portions of the wall further defining a portal through the wall;

(b) a base member having a first side and a second side, the base member including portions defining a drain hole and a feeder hole, both disposed between the first and second sides, the base member sealingly, adhesively affixed to the wall of the vessel and both holes of the base member aligned with the portal of the vessel;

(c) a drainage channel member sealingly affixed to the base member, the drainage channel member having a first open end and a second open end, and disposed to define a drainage channel, such that the first open end is in spatial communication with the drain hole of the base member, (d) a feeder channel member sealingly affixed to the base member, the feeder channel member having a first open end and a second open end, and disposed to define a feed channel, such that the first open end is in spatial communication with the feeder hole of the base member, (e) a drain hose member sealingly engaged with the drainage channel member, the drain hose member having a first open end and a second open end, and disposed to define a drain hose channel, the first open end of the drain hose member engaged with the second end of the drain channel member; and (f) a feeder hose member sealingly engaged with the drainage channel member, the feeder hose member having a first open end and a second open end, and disposed to define a feeder hose channel, the first open end of the feeder hose member engaged with the second end of the drain channel member, such that when the hole of the base member is aligned with the portal of the vessel and the base member is adhesively attached to the wall of the vessel, the system serves to provide directed fluid communication between the interior of the vessel and one end of both channel members.

12. The drainage/feeder system of claim 11, wherein the base member is adhesively affixed to the exterior of the vessel by an adhesive layer disposed between the first side of the base member and the exterior of the wall of the vessel.

13. A drainage/feeder module suitable for respectively, fluid drainage and feeding from and to a vessel, the vessel having a wall defining an interior of the vessel, portions of the wall further defining a portal through the wall, and other portions of the wall defining an exterior of the wall, the module comprising:

(a) a base member having a first side and a second side, including portions defining a drainage hole and a delivery hole disposed between the first and second sides;

(b) a drainage channel member sealingly affixed to the base member, the drainage channel member having a first open end and a second open end wherein the second open end is a bottom end, and disposed to define a drainage channel, such that the first open end of the drainage channel member is in spatial communication with the hole of the base member;

(c) a feeder channel member sealingly affixed to the base member, the feeder channel member having a first open end and a second open end wherein the second open end is a bottom end, and disposed to define a feeder channel member, such that the first open end of the feeder channel member is in spatial communication with the hole of the base member;

(d) an adhesive layer disposed adjacent the first side of the base member, the adhesive layer suitable for adhesion to the wall of the vessel, such that when the hole of the base member is aligned with the portal of the vessel and the base member is adhesively attached to the wall of the vessel so that the second ends of the drainage channel member and the feeder channel member both protrude toward the interior of the vessel, the module serves to provide directed fluid communication between the interior of the vessel and the first end of both channel members, (e) a drainage hose member connected to the second open end of the drainage channel member, wherein the drainage hose member is flexible enough for bending under the vessel, and is long enough for extending outside the vessel for draining excess fluid at a selected distance away from a bottom of the vessel and thus avoiding standing fluid under the vessel, and (f) a feeder hose member connected to the second open end of the feeder channel, wherein said feeder hose member is flexible enough for bending under the vessel and is long enough for extending outside the vessel for receiving a feeding fluid from outside the vessel and directing the feeding fluid into the vessel.

* * * * *